(12) United States Patent
Komura

(10) Patent No.: US 11,522,175 B2
(45) Date of Patent: Dec. 6, 2022

(54) METHOD OF PRODUCING CATHODE SLURRY, CATHODE AND ALL-SOLID-STATE BATTERY, AND CATHODE AND ALL-SOLID-STATE BATTERY

(71) Applicant: TOYOTA JIDOSHA KABUSHIKI KAISHA, Toyota (JP)

(72) Inventor: Shingo Komura, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 219 days.

(21) Appl. No.: 16/781,011

(22) Filed: Feb. 4, 2020

(65) Prior Publication Data
US 2020/0287208 A1    Sep. 10, 2020

(30) Foreign Application Priority Data
Mar. 5, 2019   (JP) .............................. JP2019-039588

(51) Int. Cl.
*H01M 4/36*        (2006.01)
*H01M 4/62*        (2006.01)
(Continued)

(52) U.S. Cl.
CPC .........  *H01M 4/366* (2013.01); *H01M 4/0404* (2013.01); *H01M 4/0471* (2013.01);
(Continued)

(58) Field of Classification Search
CPC ............ H01M 4/36; H01M 4/85; H01M 4/04; H01M 4/485; H01M 4/62
See application file for complete search history.

(56) References Cited

U.S. PATENT DOCUMENTS 5,523,179 A * 6/1996 Chu ........................ H01M 4/04
429/105
5,532,077 A * 7/1996 Chu ..................... H01M 4/0411
429/105
(Continued)

FOREIGN PATENT DOCUMENTS

JP    2010-251256 A    11/2010
JP    2013-115022 A    6/2013
(Continued)

*Primary Examiner* — Kenneth J Douyette
(74) *Attorney, Agent, or Firm* — Dickinson Wright, PLLC

(57) ABSTRACT

In conventional arts, it is impossible to form a good solid-solid interface in cathode mixture layers of all-solid-state batteries, which significantly deteriorates resistance of the all-solid-state battery after the charge/discharge cycle, which is problematic. A cathode slurry is produced by a method including: a first step of dispersing a conductive additive constituted of carbon in a solvent to obtain a first slurry; a second step of dispersing a sulfide solid electrolyte in the first slurry to obtain a second slurry; and a third step of dispersing a cathode active material in the second slurry to obtain a third slurry, to be used to form a cathode mixture layer. This may suppress agglomeration of the cathode active material as using the conductive additive as a core, and may lower the proportion of agglomerate present in the cathode mixture layer. As a result, a good solid-solid interface may be formed in the cathode mixture layer of the all-solid-state battery, and the resistance increase of the all-solid-state battery after the charge/discharge cycle may be suppressed.

4 Claims, 7 Drawing Sheets

(51) Int. Cl.
    *H01M 4/485*   (2010.01)
    *H01M 4/04*    (2006.01)
    *H01M 10/0562* (2010.01)
    *H01M 4/02*    (2006.01)

(52) U.S. Cl.
    CPC ............ *H01M 4/485* (2013.01); *H01M 4/625* (2013.01); *H01M 10/0562* (2013.01); *H01M 2004/028* (2013.01); *H01M 2300/0068* (2013.01)

(56) References Cited

U.S. PATENT DOCUMENTS

| | | | | |
|---|---|---|---|---|
| 2007/0009797 | A1* | 1/2007 | Takami | H01M 10/425 429/223 |
| 2010/0297496 | A1* | 11/2010 | Ravet | H01M 4/1397 429/207 |
| 2011/0033750 | A1* | 2/2011 | Hosokawa | H01M 4/131 429/223 |
| 2012/0208054 | A1* | 8/2012 | Shirasawa | H01M 10/0468 429/90 |
| 2016/0028108 | A1 | 1/2016 | Hashimoto et al. | |
| 2017/0244097 | A1 | 8/2017 | Ose et al. | |
| 2018/0138494 | A1* | 5/2018 | Birt | H01M 4/382 |
| 2018/0309128 | A1* | 10/2018 | Oyama | H01M 10/0525 |
| 2019/0067735 | A1* | 2/2019 | Fujioka | H01M 4/624 |

FOREIGN PATENT DOCUMENTS

| | | |
|---|---|---|
| JP | 2014-241282 A | 12/2014 |
| JP | 2016025025 A | 2/2016 |
| JP | 2016-103391 A | 6/2016 |
| JP | 2017-016794 A | 1/2017 |
| JP | 2017147158 A | 8/2017 |

* cited by examiner section where cathode active material is present

METHOD OF PRODUCING CATHODE SLURRY, CATHODE AND ALL-SOLID-STATE BATTERY, AND CATHODE AND ALL-SOLID-STATE BATTERY

FIELD

The present application discloses, for example, a method of producing a slurry containing a cathode active material etc.

BACKGROUND

Cathode mixture layers of all-solid-state batteries contain, for example, a cathode active material and a sulfide solid electrolyte, and may further contain a conductive additive and a binder (JP 2017-016794 A and JP 2010-251256 A). Such a cathode mixture layer may be formed by, for example, dispersing a cathode active material etc. in a solvent to form a slurry, and coating a cathode current collector or the like with the slurry to dry the coated collector (JP 2016-103391 A, JP 2014-241282 A and JP 2013-115022 A).

SUMMARY

Technical Problem

In conventional arts, it may be impossible to form a good solid-solid interface in cathode mixture layers of all-solid-state batteries, which significantly deteriorates the resistance of the all-solid-state battery after the charge/discharge cycle, which is problematic.

Solution to Problem

As one means for solving the problem, the present application discloses a method of producing a cathode slurry, the method comprising: a first step of dispersing a conductive additive constituted of carbon in a solvent to obtain a first slurry; a second step of dispersing a sulfide solid electrolyte in the first slurry to obtain a second slurry; and a third step of dispersing a cathode active material in the second slurry to obtain a third slurry.

In the method of producing the cathode slurry of the present disclosure, the solvent may contain a binder before the conductive additive is dispersed in the solvent.

In the method of producing the cathode slurry of the present disclosure, the cathode active material may be a lithium-containing transition metal oxide.

In the method of producing the cathode slurry of the present disclosure, the conductive additive may be at least one selected from a vapor grown carbon fiber, acetylene black, and furnace black.

As one means for solving the problem, the present application discloses a method of producing a cathode, the method comprising: obtaining a cathode slurry by the production method of the present disclosure; and obtaining a cathode mixture layer by using the cathode slurry.

In the method of producing the cathode of the present disclosure, a surface of a cathode current collector may be coated with the cathode slurry to be dried, to form the cathode mixture layer over the surface of the cathode current collector.

As one means for solving the problem, the present application discloses a method of producing an all-solid-state battery, the method comprising: obtaining a cathode by the production method of the present disclosure; obtaining an anode: and obtaining a solid electrolyte layer.

As one means for solving the problem, the present application discloses a cathode that includes a cathode mixture layer, wherein the cathode mixture layer contains a conductive additive constituted of carbon, a sulfide solid electrolyte, and a cathode active material, and a proportion of agglomerate present in the cathode mixture layer is at most 25%.

In the cathode of the present disclosure, a mean value of diameters of 20 circles may be at most 10.1 μm when 20 largest particles of the cathode active material are fitted with the circles on a two dimensional image obtained by observation of a cross section of the cathode mixture layer, the cathode active material being contained in the cathode mixture layer.

In the cathode of the present disclosure, the cathode active material may be a lithium-containing transition metal oxide.

In the cathode of the present disclosure, the conductive additive may be at least one selected from a vapor grown carbon fiber, acetylene black, and furnace black, As one means for solving the problem, the present application discloses an all-solid-state battery comprising: the cathode of the present disclosure; an anode; and a solid electrolyte layer.

Advantageous Effects

The technique of the present disclosure can suppress agglomeration of a cathode active material in a cathode slurry. The use of such a cathode slurry makes it possible to easily form a cathode mixture layer having a small proportion of agglomerate present. A smaller proportion of agglomerate present in a cathode mixture layer makes it possible to form a good solid-solid interface in the cathode mixture layer, which can suppress deterioration of the resistance of the all-solid-state battery after the charge/discharge cycle.

DESCRIPTION OF EMBODIMENTS

1. Method of Producing Cathode Slurry

Figure 1:
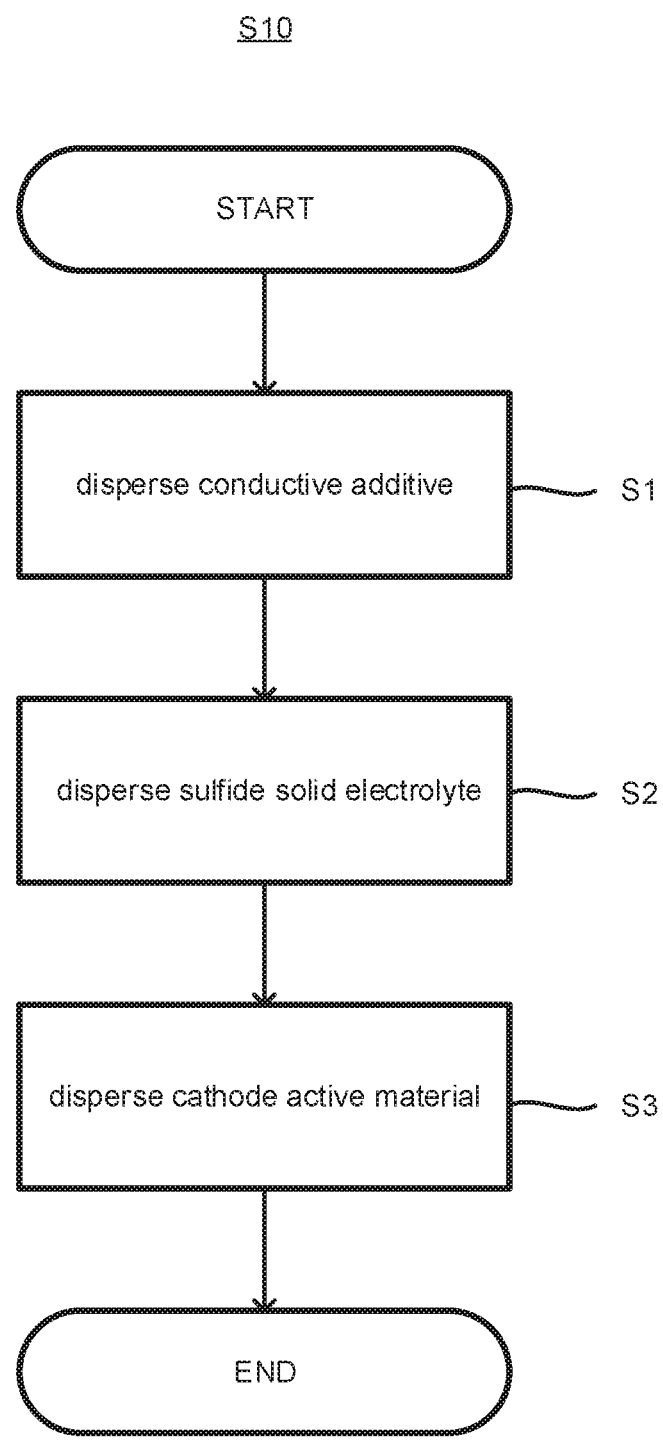
FIG. 1 is an explanatory flowchart of a method of producing a slurry S10.
Figure 2A:
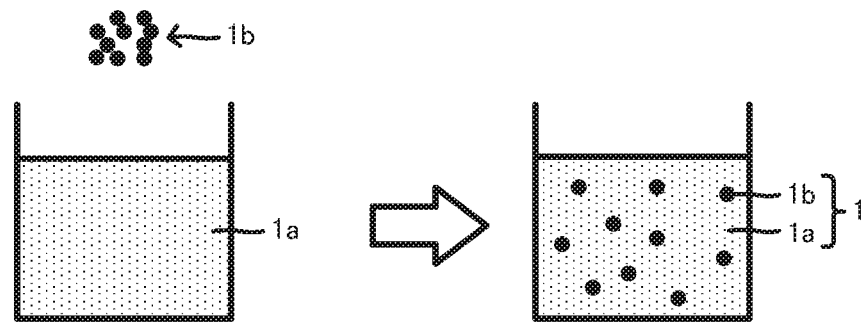
FIGS. 2A to 2C explanatorily show a flow of the method of producing a slurry S10.
Figure 2B:
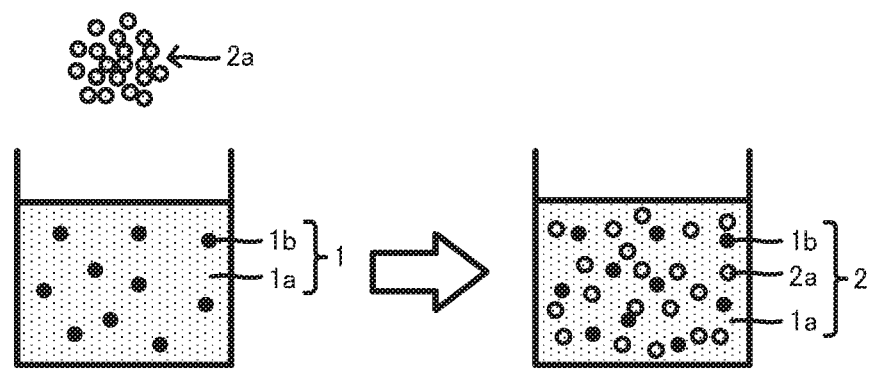
Figure 2C:
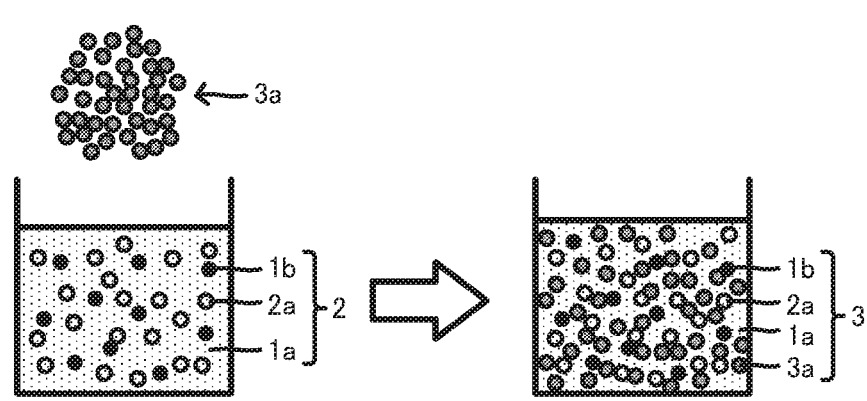

FIGS. 1 to 2C show the flow of a method of producing a cathode slurry S10. As shown in FIGS. 1 to 2C, the method of producing a cathode slurry S10 includes a first step S1 of dispersing a conductive additive constituted of carbon 1b in a solvent 1a to obtain a first slurry 1; a second step S2 of dispersing a sulfide solid electrolyte 2a in the first slurry 1 to obtain a second slurry 2; and a third step S3 of dispersing a cathode active material 3a in the second slurry 2 to obtain a third slurry 3.

1.1. First Step S1

As shown in FIG. 2A, in the first step S1, the conductive additive constituted of carbon 1b is dispersed in the solvent 1a to obtain the first slurry 1.

1.1.1. Solvent 1a

Any solvent may be suitably selected as the solvent 1a in view of dispersibility of the solid content, reactivity to a sulfide solid electrolyte, etc. Any low-polarity solvent that does not substantially contain water may be employed as the solvent 1a in view of suppression of the reaction to the sulfide solid electrolyte 2a. For example, butyl butyrate may be employed for the solvent 1a. Only one solvent may be used alone, and two or more solvents may be used in combination as the solvent 1a.

1.1.2. Conductive Additive 1b

Any conductive additive that is generally used as a conductive additive contained in cathodes of all-solid-state batteries may be employed for the conductive additive 1b, which is constituted of carbon. For example, a carbon black such as acetylene black, furnace black, and ketjen black; a fibrous carbon such as vapor grown carbon fibers, carbon nanotubes, and carbon nanofibers; graphite; or the like may be employed for the conductive additive 1b. The conductive additive 1b may be at least one selected from vapor grown carbon fibers, acetylene black, and furnace black. Only one conductive additive may be used, or two or more conductive additives may be used in combination as the conductive additive 1b. The shape and size of the conductive additive 1b are not specifically limited, and ordinary shape and size as a conductive additive contained in cathodes of all-solid-state batteries may be employed. For example, when the conductive additive 1b is in the form of a particle, the particle size thereof may be 5 nm to 1 μm. Or, when the conductive additive 1b is in the form of a fiber, the fiber diameter thereof may be 5 nm to 1 μm, and the aspect ratio thereof may be at least 20.

1.1.3. Mixing Ratio

The mixing ratio of the solvent 1a and the conductive additive 1b in the first slurry 1 is not particularly limited, and may be suitably adjusted in view of handleability of the slurry etc. For example, the conductive additive 1b may be 5 volume % to 55 volume % of the first slurry 1 when the total volume of the first slurry 1 is defined as 100 volume %.

1.1.4. Dispersion Method

The method of dispersing the conductive additive 1b in the solvent 1a is not particularly limited. Any method such as a dispersing method by means of an ultrasonic wave, and a dispersing method using a mechanical mixing means such as a ball mill and a mixing blade may be employed. The dispersing time in the first step S1 is not particularly limited either, and may be adjusted so that the conductive additive 1b disperses approximately uniformly all over the first slurry 1.

1.2. Second Step S2

As shown in FIG. 2B, in the second step S2, the sulfide solid electrolyte 2a is dispersed in the first slurry 1 to obtain the second slurry 2.

1.2.1. Sulfide Solid Electrolyte 2a

Any sulfide solid electrolyte that is generally used as a sulfide solid electrolyte contained in cathodes of all-solid-state batteries may be employed for the sulfide solid electrolyte 2a. For example, a sulfide solid electrolyte containing Li and S as constituent elements may be employed for the sulfide solid electrolyte 2a. The sulfide solid electrolyte 2a may further contain P, halogen, and any element other than them as a constituent element, in addition to Li and S. Specific examples of the sulfide solid electrolyte 2a include $Li_2S$—$P_2S_5$, $Li_2S$—$SiS_2$, $LiI$—$Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$. One sulfide solid electrolyte may be used alone, and two or more sulfide solid electrolytes may be used in combination as the sulfide solid electrolyte 2a. The sulfide solid electrolyte 2a may be crystalline, and may be amorphous. The shape and size of the sulfide solid electrolyte 2a are not specifically limited, and ordinary shape and size as a sulfide solid electrolyte contained in cathodes of all-solid-state batteries may be employed.

1.2.2. Mixing Ratio

The mixing ratio of the solvent 1a, the conductive additive 1b, and the sulfide solid electrolyte 2a in the second slurry 2 is not particularly limited, and may be suitably adjusted in view of handleability of the slurry, the performance of the battery to be aimed, etc. For example, the conductive additive 1b and the sulfide solid electrolyte 2a in total may be 5 volume % to 65 volume % of the second slurry 2 when the total volume of the second slurry 2 is defined as 100 volume %.

1.2.3. Dispersion Method

The method of dispersing the sulfide solid electrolyte 2a in the first slurry 1 is not particularly limited. Any method such as a dispersing method by means of an ultrasonic wave, and a dispersing method using a mechanical mixing means such as a ball mill and a mixing blade may be employed. The dispersing time in the second step S2 is not particularly limited either, and may be adjusted so that the sulfide solid electrolyte 2a disperses approximately uniformly all over the second slurry 2.

1.3. Third Step S3

As shown in FIG. 2C, in the third step S3, the cathode active material 3a is dispersed in the second slurry 2 to obtain the third slurry 3.

1.3.1. Cathode Active Material 3a

Any cathode active material that is generally used as a cathode active material contained in cathodes of all-solid-state batteries may be employed for the cathode active material 3a. Particularly, employing a basic cathode active material for the cathode active material 3a makes the effect of the technique of the present disclosure further outstanding. For example, the cathode active material 3a may be a compound containing Li as a constituent element, and may be an oxide containing Li and a transition metal as constituent elements, that is, a Li-containing transition metal oxide. More specific examples thereof include: lithium cobaltate of $LiCoO_2$; lithium nickelate of $LiNiO_2$; lithium manganate of $LiMn_2O_4$; $LiNi_{1/3}Mn_{1/3}Co_{1/3}O_2$; different kind element substituent LiMn spinels represented by $Li_{1+x}Mn_{2-x-y}M_yO_4$ where M is at least one selected from Al, Mg, Co, Fe, Ni and Zn; lithium titanate of $Li_xTiO_y$; and lithium metal phosphates of $Li_xM_y(PO_4)_z$ where M is at least one selected from Fe, Mn, Co, Ni and Ti. The cathode active material 3a may be an oxide containing lithium, and at least one element selected from cobalt, manganese, and nickel. Only one cathode active material may be used alone, and two or more cathode active materials may be used in combination as the cathode active material 3a. A coating layer having ionic conductivity may be formed over the surface of the cathode active material 3a. For example, a coating layer constituted of a lithium-containing oxide, more specifically a coating layer constituted of an oxide containing lithium and niobium may be formed thereover. The shape and size of the cathode active material 3a are not specifically limited, and ordinary shape and size as a cathode active material contained in cathodes of all-solid-state batteries may be employed. For example, when the cathode active material 3a is in the form of a particle, the particle may be a primary particle, and may be a secondary particle of agglomeration of the primary particles. In this case, the primary particle size of the cathode active material 3a may be, for example, 1 nm to 100 μm. The lower limit thereof may be at least 5 nm, may be at least 10 nm, and may be at least 50 nm. The upper limit thereof may be at most 50 μm, may be at most 30 μm, and may be at most 15 μm. When the cathode active material 3a is a secondary particle, the secondary particle size may be, for example, 0.5 μm to 100 μm. The lower limit thereof may be at least 1 μm, and the upper limit thereof may be at most 50 μm.

1.3.2. Mixing Ratio

The mixing ratio of the solvent 1a, the conductive additive 1b, the sulfide solid electrolyte 2a, and the cathode active material 3a in the third slurry 3 is not particularly limited, and may be suitably adjusted in view of handleability of the slurry, the performance of the battery to be aimed, etc. For example, the conductive additive 1b, the sulfide solid electrolyte 2a, and the cathode active material 3a in total may be 5 volume % to 65 volume % of the third slurry 3 when the total volume of the third slurry 3 is defined as 100 volume %.

1.3.3. Dispersion Method

The method of dispersing the cathode active material 3a in the second slurry 2 is not particularly limited. Any method such as a dispersing method by means of an ultrasonic wave, and a dispersing method using a mechanical mixing means such as a ball mill and a mixing blade may be employed. The dispersing time in the third step S3 is not particularly limited either, and may be adjusted so that the cathode active material 3a disperses approximately uniformly all over the third slurry 3.

1.4. Other Steps

The method of producing a cathode slurry of the present disclosure may include any step other than the steps S1 to S3 as long as the problem may be solved. For example, a step of containing some additive in the slurry may be included. The timing when an additive is contained is not particularly limited, and may be prior to the first step S1, may be after the first step S1 and prior to the second step S2, may be after the second step S2 and prior to the third step S3, and may be after the third step S3.

Figure 5:
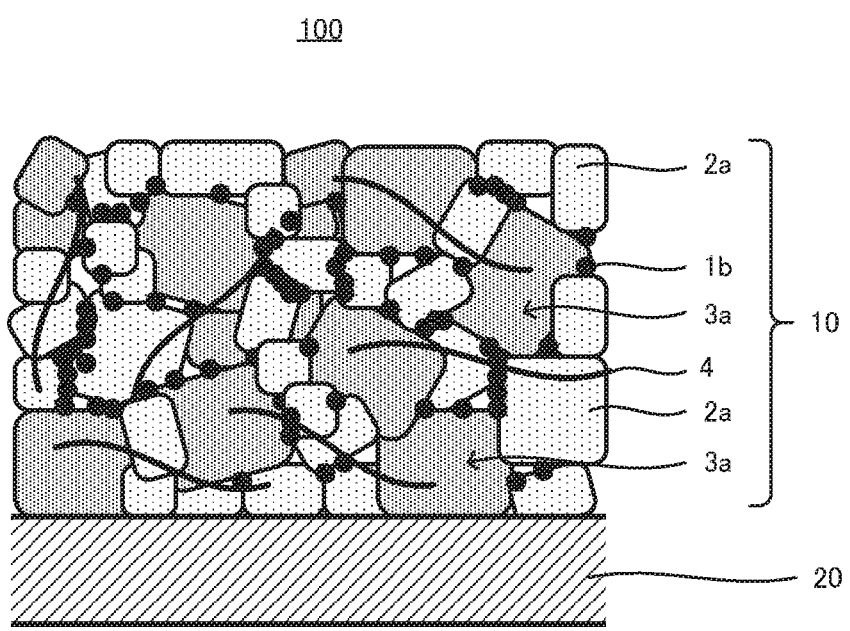
FIG. 5 is an explanatory schematic view of a structure of a cathode 100.

A binder, that is, the binder 4 in FIG. 5 may be employed for an additive. The binder 4 has the function of binding the conductive additive 1b, the cathode active material 2a, and the sulfide solid electrolyte 3a in a cathode mixture layer that will be described later. In the production method S10, containing the binder 4 in the solvent 1a in advance makes it possible for the thickening effect of the binder 4 to further improve dispersiveness of the solid content. With the foregoing in view, in the production method S10, the solvent 1a may contain a binder prior to dispersing the conductive additive 1b in the solvent 1a. As the binder 4, for example, styrene-butadiene rubber (SBR), carboxymethyl cellulose (CMC), acrylonitrile-butadiene rubber (ABR), butadiene rubber (BR), polyvinylidene fluoride (PVDF), polytetrafluoroethylene (PTFE), or a copolymer thereof, or a copolymer thereof and any other polymerized unit may be employed. Only one binder may be used alone, and two or more binders may be used in combination as the binder 4. The mixing ratio of the solvent 1a and the binder 4 is not particularly limited, and may be suitably adjusted in view of the performance of the battery to be aimed etc. The binder 4 may dissolve, may swell but not dissolve, and may disperse as the solid content, in the solvent 1a.

1.5. Function and Effect

When a cathode mixture layer of an electrolyte solution-based battery is produced, a cathode active material, a conductive additive, etc. together with a solvent are formed to be a slurry, and the slurry is applied to a substrate, a current collector, or the like, to obtain the cathode mixture layer. Here, when a binder is contained in the slurry, the binder gives a thickening effect, which makes it possible to give a viscosity suitable for the pot life of the slurry, and for sagging in coating.

In contrast, when a cathode mixture layer of an all-solid-state battery is produced, it is necessary to contain a sulfide solid electrolyte together with a cathode active material and a conductive additive, in a cathode slurry. In this case, reaction of a solvent and the sulfide solid electrolyte has to be suppressed, which limits solvents applicable to this case. For example, a low-polarity solvent containing an extremely small amount of water may be employed for the solvent. Employing a solvent well suitable for the sulfide solid electrolyte may however deteriorate solubility of a binder in the solvent, which makes it impossible to sufficiently have the thickening effect of the binder. As a result, the cathode active material further easily agglomerates or the like in the slurry. As a result of his intensive study started from such a problem, the inventor of the present disclosure obtained the following findings.

(1) In a slurry, a cathode active material easily agglomerates as using a conductive additive constituted of carbon as a core. This is believed to be because strong acid-base interactions on the surface of a conductive additive constituted of carbon makes it easy for the conductive additive to draw the cathode active material: these strong acid-base interactions are derived from a certain specific surface area of the conductive additive, and a functional group inevitably present on the surface of the conductive additive.

(2) A sulfide solid electrolyte has the function of suppressing agglomeration due to acid-base interactions.

Based on these findings, in the production method S10 of the present disclosure: first, the conductive additive 1b is dispersed in the solvent 1a; next, the sulfide solid electrolyte 2a is dispersed therein to suppress acid-base interactions due to the conductive additive 1b; and thereafter the cathode active material 3a is dispersed therein. This can outstandingly suppress agglomeration of the cathode active material 3a in the cathode slurry. The use of this cathode slurry makes it possible to easily form a cathode mixture layer including a small amount of agglomerate. A small proportion of agglomerate present in the cathode mixture layer makes it possible to form a good solid-solid interface in the cathode mixture layer, which can suppress deterioration of resistance of the all-solid-state battery after the charge/discharge cycle.

2. Method of Producing Cathode

Figure 3:
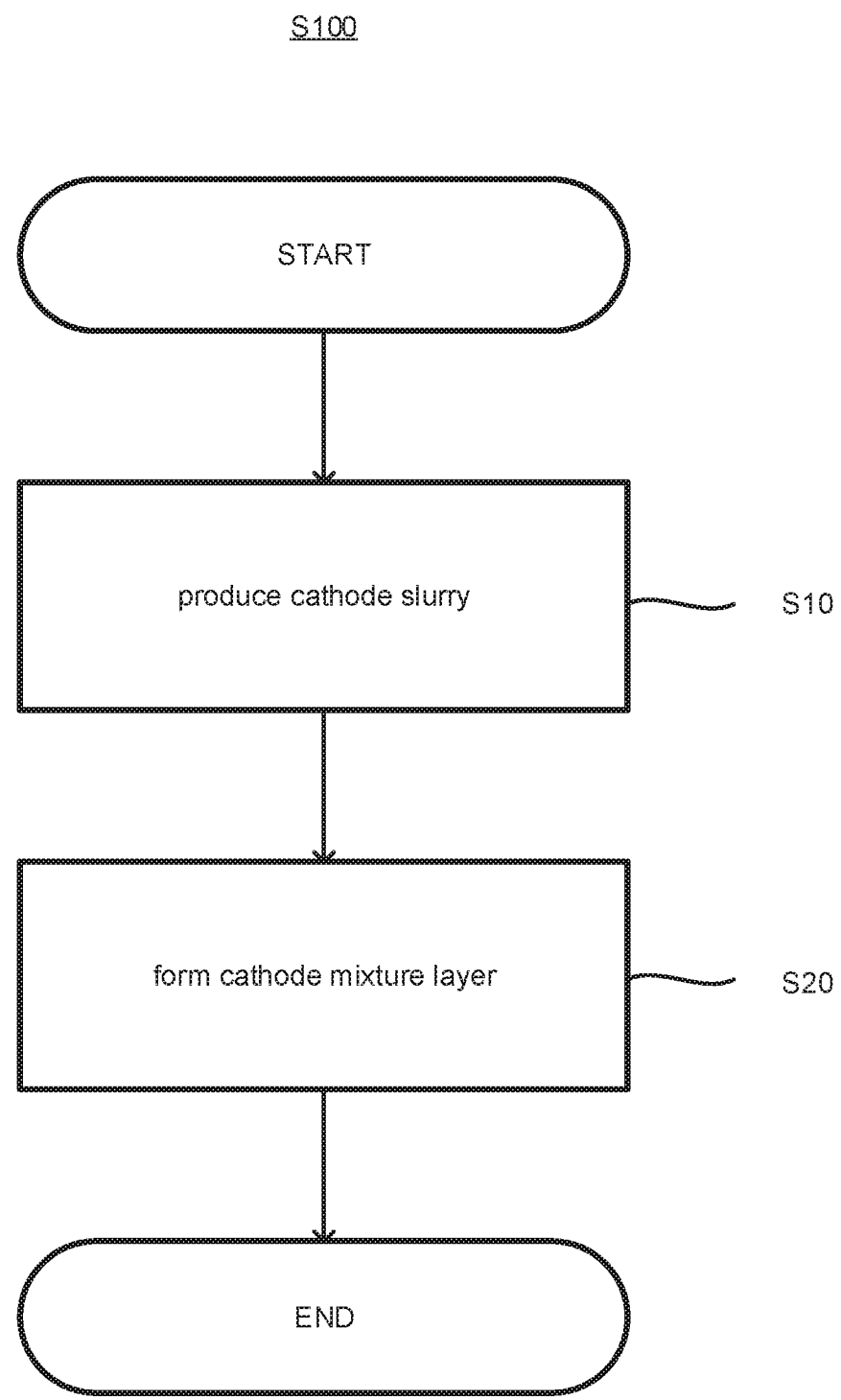
FIG. 3 is an explanatory flowchart of a method of producing a cathode S100.

FIG. 3 shows the flow of a method of producing a cathode S100. As shown in FIG. 3, the production method S100 includes a step of obtaining the cathode slurry by the production method S10; and a step S20 of obtaining the cathode mixture layer by using the cathode slurry. The production method S10 is as described above, and thus description thereof is omitted here.

The step S20 is a step of obtaining the cathode mixture layer by using the cathode slurry obtained by the production method S10. In the step S20, the cathode mixture layer may be obtained by the wet process, and may be obtained by the dry process. Examples of the wet process include the process of coating the surface of a cathode current collector with the cathode slurry and drying the coated surface, to form the cathode mixture layer over the surface of the cathode current collector. In this case, adjustment of the coating amount makes it possible to easily adjust the thickness of the dried cathode mixture layer. The dried cathode mixture layer may be pressed. The means of coating with the cathode slurry is not particularly limited. Examples thereof include a doctor blade. In contrast, examples of the dry process include the process of drying the cathode slurry to obtain a powder cathode mixture, and thereafter press-molding the powder cathode mixture to obtain the cathode mixture layer. The means of press molding is not particularly limited. Examples thereof include pressing by means of a die, and roll pressing.

As described above, the cathode slurry obtained by the production method S10 can be described as such that agglomeration of the cathode active material 3a is suppressed and each of the conductive additive 1b, the sulfide solid electrolyte 2a and the cathode active material 3a highly disperses therein. The use of the cathode slurry produced by the production method S10, in the production method S100 makes it possible to suppress agglomeration of the cathode active material 3a in the cathode mixture layer, which makes it possible to form a good solid-solid interface in the cathode mixture layer.

3. Method of Producing all-Solid-State Battery

Figure 4:
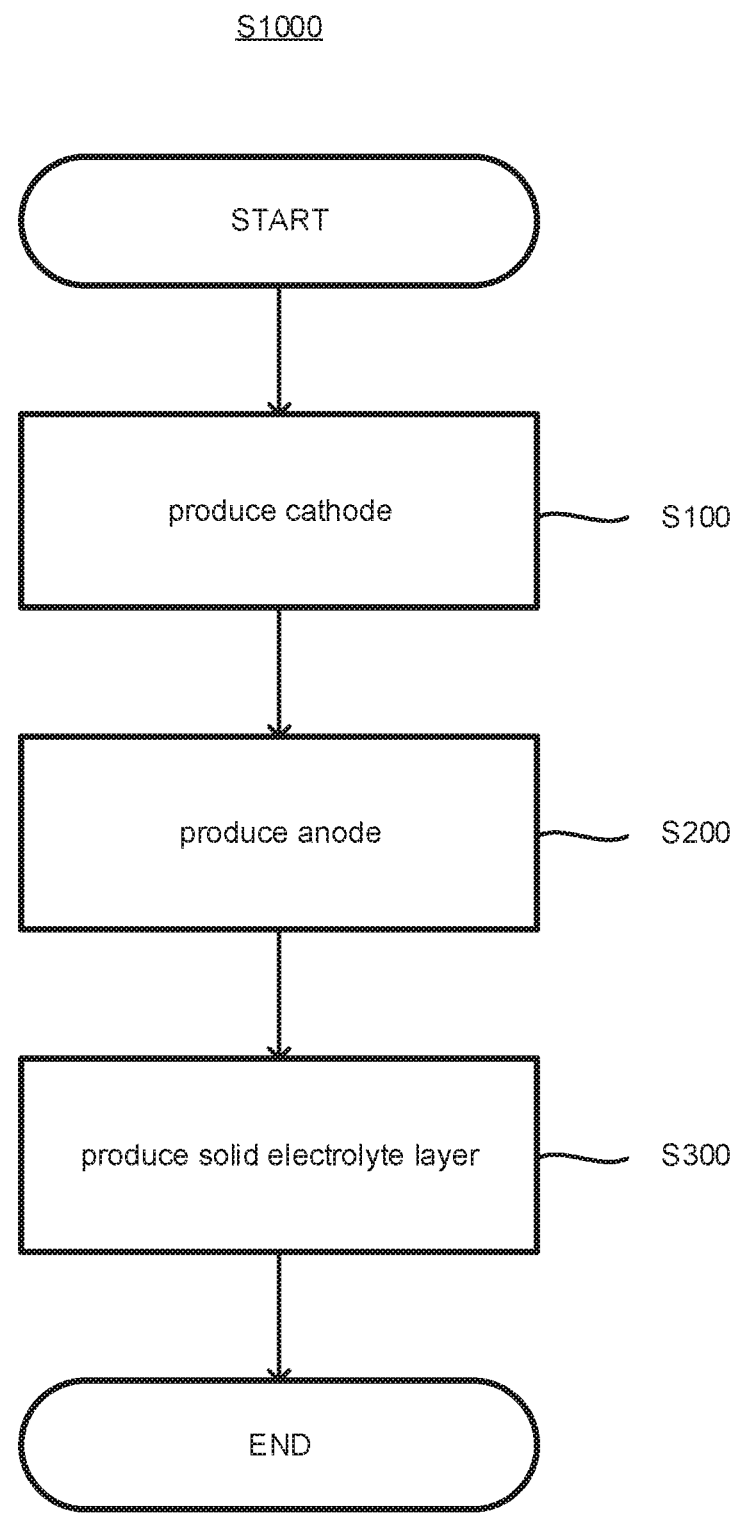
FIG. 4 is an explanatory flowchart of a method of producing an all-solid-state battery S1000.

FIG. 4 shows the flow of a method of producing an all-solid-state battery S1000. As shown in FIG. 4, the production method S1000 includes a step of obtaining the cathode by the production method S100; a step S200 of obtaining an anode: and a step S300 of obtaining the solid electrolyte layer. The production method S100 is as described above, and thus description thereof is omitted here.

The step S200 is a step of obtaining an anode. The anode may be produced by a known method. For example, the anode may be formed by forming an anode mixture layer containing an anode active material etc. over a surface of an anode current collector that will be described later. Specifically, the anode including the anode mixture layer over the surface of the anode current collector may be produced by dispersing the anode active material etc. in a solvent to form an anode slurry, and coating the surface of the anode current collector with the anode slurry and drying the coated surface. Or, one may layer powder of an anode mixture on the anode current collector by the dry process to use the resultant as the anode.

The step S300 is a step of obtaining a solid electrolyte layer. The solid electrolyte layer may be produced by a known method. For example, the solid electrolyte layer may be formed by a solid electrolyte and a binder which will be described later. Specifically, the solid electrolyte layer may be formed over the surface of the cathode mixture layer and/or the surface of the anode mixture layer by dispersing the solid electrolyte and the binder in a solvent to form a solid electrolyte slurry, and applying the solid electrolyte slurry to the surface of the cathode mixture layer and/or the surface of the anode mixture layer to dry the surface. Or, the solid electrolyte layer may be obtained by forming the solid electrolyte layer over a substrate, and thereafter removing the substrate. Or, the solid electrolyte layer may be obtained by molding the solid electrolyte and the binder by the dry process.

The order of the steps S100 to S300 in the production method S1000 is not limited to that shown in FIG. 4. The anode and the solid electrolyte layer may be obtained prior to the cathode.

As described above, in the cathode obtained by the production method S100, agglomeration of the cathode active material 3a in the cathode mixture layer is suppressed, and a good solid-solid interface is formed in the cathode mixture layer. The production of the all-solid-state battery using the cathode produced by the production method S100, in the production method S1000 makes it possible to suppress deterioration of the resistance of the all-solid-state battery after the charge/discharge cycle.

4. Cathode 100

FIG. 5 schematically shows the structure of a cathode 100. In FIG. 5, the materials same as in FIGS. 2A to 2C are denoted by the same reference signs as in FIGS. 2A to 2C. As shown in FIG. 5, the cathode 100 includes the cathode mixture layer 10. The cathode mixture layer 10 contains the conductive additive 1b, which is constituted of carbon, the sulfide solid electrolyte 2a, and the cathode active material 3a. The proportion of agglomerate present in the cathode mixture layer 10 is at most 25%.

4.1. Material Constituting Cathode Mixture Layer 10

The cathode mixture layer 10 contains the conductive additive 1b, which is constituted of carbon, the sulfide solid electrolyte 2a, and the cathode active material 3a. As shown in FIG. 5, the cathode mixture layer 10 may contain the binder 4. Materials that may be contained in the cathode mixture layer 10 as the conductive additive 1b, the sulfide solid electrolyte 2a, the cathode active material 3a, and the binder 4 are as described above. For example, the cathode active material 3a may be a lithium-containing transition metal oxide, and the conductive additive 1b may be at least one selected from vapor grown carbon fibers, acetylene black, and furnace black.

The compounding ratio of each component in the cathode mixture layer 10 is not particularly limited, and may be suitably determined according to the performance of the battery to be aimed etc. For example, in the cathode mixture layer 10, the content of the cathode active material 3a may be the highest and then the content of the sulfide solid electrolyte 2a may be the second highest. Containing a small amount of the conductive additive 1b and of the binder 4 makes it possible to achieve the performance to be aimed. The proportion of agglomerate present in the cathode mixture layer 10 of at most 25% leads to formation of a good solid-solid interface in the cathode mixture layer 10, which makes it possible to suppress the increase of the resistance after the charge/discharge cycle even if a large amount of the cathode active material 3a is contained in the cathode mixture layer 10 as described above.

The content of each component in the cathode mixture layer 10 may be, for example, approximately as follows: when the total mass of the cathode mixture layer 10, that is, the total mass of the solid content is defined as 100 mass %, the content of the cathode active material 3a may be 30 mass % to 90 mass %, the lower limit thereof may be at least 50 mass %, and the upper limit thereof may be at most 85 mass %; the content of the sulfide solid electrolyte 2a may be 5 mass % to 60 mass %, the lower limit thereof may be at least 10 mass %, and the upper limit thereof may be at most 45 mass %; the content of the conductive additive 1b may be 0.5 mass % to 30 mass %, the lower limit thereof may be at least 1 mass %, and the upper limit thereof may be at most 10 mass %; and further the content of the binder 4 may be 0.5 mass % to 30 mass %, the lower limit thereof may be at least 1 mass %, and the upper limit thereof may be at most 10 mass %.

In the cathode 100, the mean value, which is represented by r described later, of diameters of 20 circles may be at most 10.1 μm when 20 largest particles of the cathode active material 3a contained in the cathode mixture layer 10 are fitted with the circles on a two dimensional image obtained by observation of a cross section of the cathode mixture layer 10. When this mean value of the particle diameters of the cathode active material 3a is at most 10.1 μm, the specific surface area of the cathode active material 3a is large, which makes it further easy to secure the contact interface of the cathode active material 3a and the sulfide solid electrolyte 2a.

The thickness of the cathode mixture layer is not particularly limited, and may be suitably determined according to the performance of the battery to be aimed. The thickness of the cathode mixture layer 10 may be, for example, 0.1 μm to 1 mm, and may be 1 μm to 150 μm.

4.2. Proportion of Agglomerate Present in Cathode Mixture Layer 10

In the cathode 100, it is important that the proportion of agglomerate present in the cathode mixture layer 10 is at most 25%. The upper limit thereof may be at most 16%. The lower limit thereof is not particularly limited, and may be at least 0%, may be at least 1%, and may be at least 3%. The proportion of agglomerate present in the cathode mixture layer 10 of at most 25% as described above makes it possible to form a good solid-solid interface in the cathode mixture layer 10.

In the present application, "the proportion of agglomerate present in the cathode mixture layer" is calculated by the following steps. The calculation method of "the proportion of agglomerate present in the cathode mixture layer" will be described with reference to FIGS. 6A to 6D.

(1) A cross section of the cathode is subjected to ion milling, and 20 largest particles of the cathode active material, where when the particle is a secondary particle, the whole of the secondary particle is regarded as one particle, are fitted with circles on a two dimensional image of the cross section obtained by observation by means of a scanning electron microscope (SEM), to identify the mean value r (μm) of the diameters of these 20 circles.

Figure 6A:
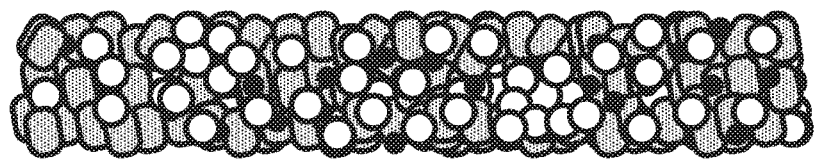
FIGS. 6A to 6D are explanatory schematic views showing a method of measuring the proportion of agglomerate present in a cathode mixture layer.
Figure 6B:
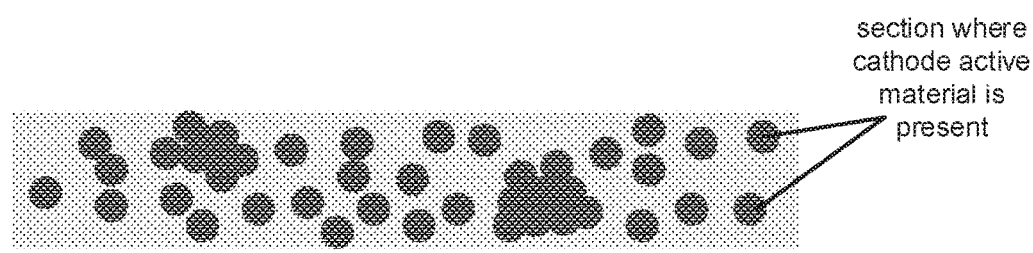
Figure 6C:
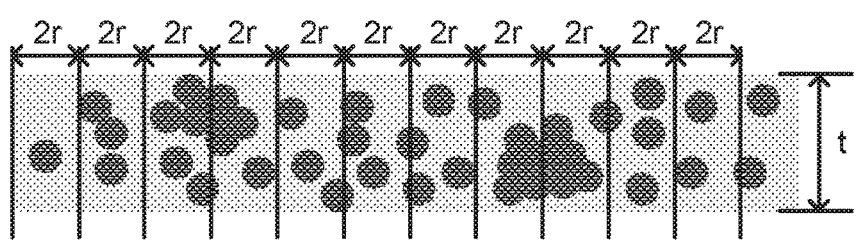
Figure 6D:
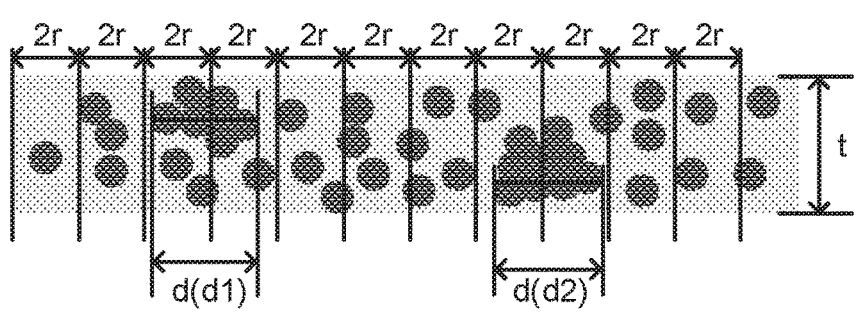

(2) The cross section of the cathode is observed and analyzed by means of SEM-EDX as magnified so that all the thickness of the cathode mixture layer on one face side is observable, and the size of the agglomerate of the cathode active material is measured by the following steps:

(2-1) a two dimensional image of the cross section of the cathode, which is cross-sectioned by cryo cross-section polishing is obtained by means of SEM-EDX (FIG. 6A);

(2-2) element mapping of P, S, and C is carried out on the obtained two dimensional image of the cross section, and a part where the detected intensity of P, S, and C is at most 1/10 of the other section is regarded as a section where the cathode active material is present (FIG. 6B);

(2-3) m through lines are drawn at regular intervals of 2r (μm) in pitch on an image of the element mapping in the direction orthogonal to the thickness direction, that is, the face direction of the cathode mixture layer (FIG. 6C);

(2-4) out of the sections where the cathode active material is regarded to be present, a section having a longest length of at least 3r (μm) is extracted, and the longest length of the extracted section is defined as d (μm) (FIG. 6D). The direction of "longest length" may be the same as the through lines, and may be a direction crossing the through lines. FIG. 6D shows the case where the longest length d is in the direction orthogonal to the through lines for convenient description. In FIG. 6D, two sections having a longest length of at least 3r where the cathode active material is present are present on the obtained two dimensional image of the cross section, and d of each section, that is, d1 and d2 are to be measured; and (2-5) the ratio d/t of the length d (μm) of the section to the thickness t (μm) of the cathode mixture layer is obtained, a section satisfying $0.3 < d/t$ is defined as an agglomerate section, the number n of the through lines crossing the agglomerate section is obtained, and the ratio n/m of the number n of the through lines crossing the agglomerate section to the total number m of the through lines is calculated as "the proportion of agglomerate present".

4.3. Other Components

The cathode 100 may include a cathode current collector 20 over the surface of the cathode mixture layer 10 in view of further easy current collection in the cathode 100. Any of known cathode current collectors of all-solid-state batteries may be employed for the cathode current collector 20. For example, the cathode current collector 20 may be constituted of metal foil, metal mesh, or the like. Examples of a metal constituting the cathode current collector 20 include Ni, Cr, Au, Pt, Al, Fe, Ti, Zn and stainless steel. The cathode current collector 20 may have some coating layer over the surface thereof. The thickness of the cathode current collector 20 is not particularly limited, and for example, may be 0.1 μm to 1 mm, and may be 1 μm to 100 μm. FIG. 5 illustrates the embodiment of providing the cathode mixture layer 10 only for one face of the cathode current collector 20. The cathode mixture layer 10 may be provided for both faces of the cathode current collector 20.

5. All-Solid-State Battery

Figure 7:
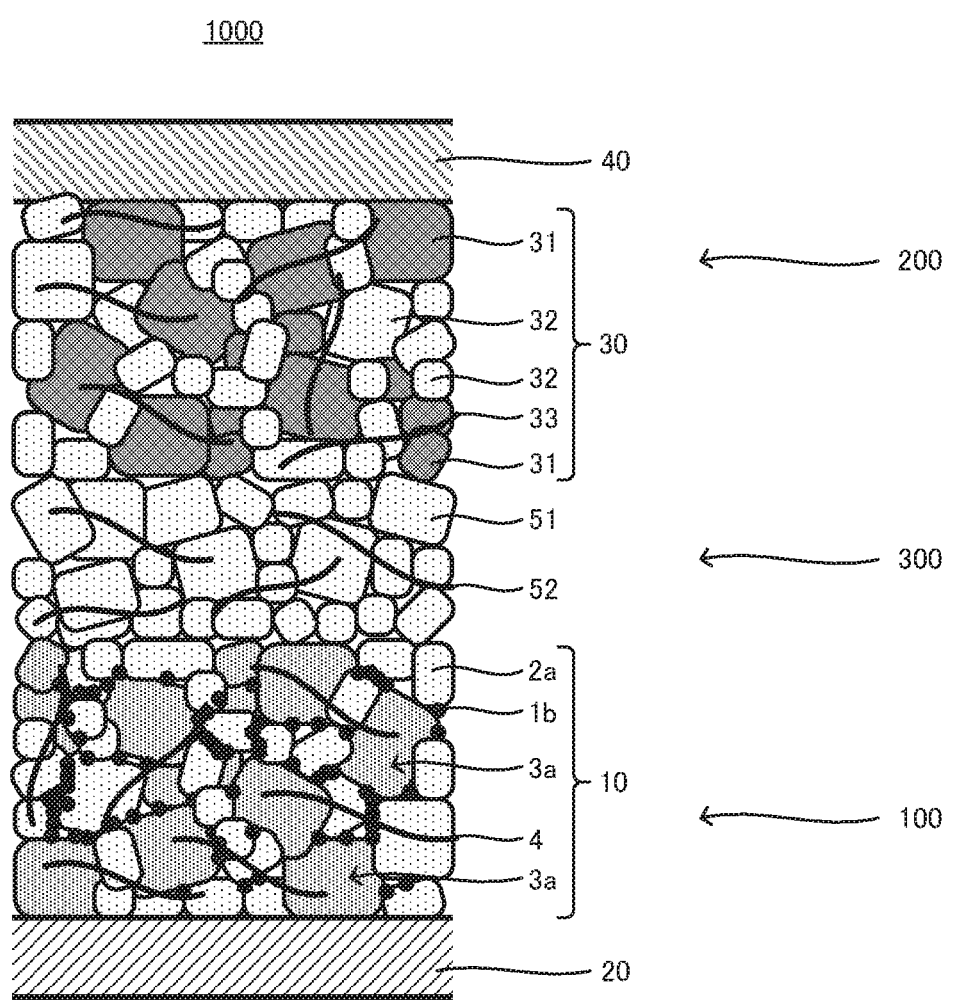
FIG. 7 is an explanatory schematic view of a structure of an all-solid-state battery 1000.

FIG. 7 schematically shows the structure of an all-solid-state battery 1000. As shown in FIG. 7, the all-solid-state battery 1000 includes the cathode 100, an anode 200, and a solid electrolyte layer 300. Including the cathode 100 in the all-solid-state battery 1000 makes it possible to secure a good solid-solid interface in the cathode mixture layer 10 to suppress the increase of the resistance after the charge/discharge cycle.

5.1. Anode 200

The structure of the anode 200 in the all-solid-state battery 1000 is obvious for the person skilled in the art, but one example thereof will be hereinafter described. The anode 200 usually includes an anode mixture layer 30 containing an anode active material 31, and as optional components, a solid electrolyte 32, a binder 33, and other additives such as a conductive additive and a thickener. The anode mixture layer 30 may be provided for the surface of an anode current collector 40.

5.1.1. Anode Mixture Layer 30

The anode mixture layer 30 is a layer containing at least the anode active material 31, and may further contain the solid electrolyte 32, the binder 33, a conductive additive that is not shown, etc. optionally, in addition to the anode active material 31. A known active material may be used as the anode active material 31. A material that stores and releases a predetermined ion at a baser potential, that is, whose charge-discharge potential is baser than the cathode active material 3a may be used as the anode active material among known active materials. For example, Si or a Si alloy; a carbon material such as graphite and hard carbon; any oxide such as lithium titanate; lithium metal or a lithium alloy; or the like may be used. Any solid electrolyte, binder, and conductive additive that are listed as the examples for being used in the cathode mixture layer 10 may be suitably selected and used as the solid electrolyte 32, the binder 33, and the conductive additive. The content of each component in the anode mixture layer 30 may be the same as a conventional content. The shape of the anode mixture layer 30 may be also the same as a conventional shape. Particularly, the anode mixture layer 30 may be in the form of a sheet in view of an easy structure of the all-solid-state battery 1000. In this case, the thickness of the anode mixture layer 30 may be, for example, 0.1 µm to 1 mm, and may be 1 µm to 100 µm. The thickness of the anode mixture layer 30 may be determined so that the capacity of the anode 200 is larger than that of the cathode 100.

5.1.2. Anode Current Collector 40

The anode current collector 40 may be constituted of metal foil, metal mesh, or the like. Examples of a metal constituting the anode current collector 40 include Cu, Ni, Fe, Ti, Co, Zn, and stainless steel. The anode current collector 40 may have some coating layer over the surface thereof. The thickness of the anode current collector 40 is not particularly limited, and for example, may be 0.1 µm to 1 mm, and may be 1 µm to 100 µm.

5.2. Solid Electrolyte Layer 300

The structure of the solid electrolyte layer 300 in the all-solid-state battery 1000 is obvious for the person skilled in the art, but hereinafter one example will be described. The solid electrolyte layer 300 contains a solid electrolyte 51, and optionally a binder 52. Any solid electrolyte other than the sulfide solid electrolyte, such as an oxide solid electrolyte may be employed for the solid electrolyte 51. The sulfide solid electrolyte is particularly preferably employed. A binder same as the binder 4 may be suitably selected and used as the binder 52 that may be contained in the solid electrolyte layer 300. The content of each component in the solid electrolyte layer 300 may be the same as a conventional content. The shape of the solid electrolyte layer 300 may be also the same as a conventional shape. For example, the solid electrolyte layer 300 may be in the form of a sheet. In this case, the thickness of the solid electrolyte layer 300 may be, for example, 0.1 µm to 300 µm, and may be 0.1 µm to 100 µm.

5.3. Other Components

The all-solid-state battery 1000 may be produced by, for example, laminating and pressing the cathode 100, the solid electrolyte layer 300, and the anode 200. Needless to say, the all-solid-state battery 1000 may include necessary terminals, battery case, etc. in addition to the cathode 100, the anode 200, and the solid electrolyte layer 300. The all-solid-state battery 1000 may also include a constraining member for applying a constraint pressure in the direction of laminating each layer. These components are known, and detailed description thereof is omitted here.

EXAMPLES

1. Comparative Example 1

1.1. Making Cathode Slurry

A cathode active material of a lithium nickel cobalt manganese oxide having a mean value r of 20 longest circle equivalent diameters of particles thereof of 5.1 µm, and a specific surface area of at least 1.01 m$^2$/g, a sulfide solid electrolyte of a Li$_2$S—P$_2$S$_5$-based solid electrolyte, a conductive additive of a vapor grown carbon fiber (VGCF), and a binder of a PVdF-based binder were each weighed so that their mass ratio was such that cathode active material:solid electrolyte:conductive additive:binder=60:35:2:3, added to a solvent of butyl butyrate at the same time, and dispersed by means of an ultrasonic homogenizer (power: 50 W) for 6 minutes, to obtain a cathode slurry.

1.2. Making Cathode

A cathode current collector of aluminum foil having a thickness of approximately 15 µm was coated with the obtained cathode slurry by means of a doctor blade so that the amount of the coated cathode slurry was 5 mg/cm$^2$ to 35 mg/cm$^2$, gradually dried at 50° C., 100° C., and 150° C. to form a cathode mixture layer over the surface of the cathode current collector, and pressed to obtain a cathode for evaluation. The thickness of the cathode mixture layer was 40 µm.

A cross section of a cathode that was obtained by the same manner as the above was observed and analyzed by means of SEM-EDX, to calculate the proportion of agglomerate present in the cathode mixture layer, that is, the foregoing n/m.

1.3. Making Anode

An anode active material of lithium titanate, a sulfide solid electrolyte of a Li$_2$S—P$_2$S$_5$-based solid electrolyte, and a binder of a PVdF-based binder were added to and dispersed in butyl butyrate, to obtain an anode slurry. An anode current collector of copper foil having a thickness of approximately 15 µm was coated with the obtained anode slurry by means of a doctor blade, and after dried, pressed to obtain an anode.

1.4. Making Solid Electrolyte Layer

A sulfide solid electrolyte of a Li$_2$S—P$_2$S$_5$-based solid electrolyte, and a binder of a PVdF-based binder were weighed so that their mass ratio was 95:5, and added to and dispersed in butyl butyrate, to obtain a solid electrolyte slurry. A transfer substrate of aluminum foil was coated with the obtained solid electrolyte slurry by means of a doctor blade, and after dried, pressed to obtain a solid electrolyte layer.

1.5. Making all-Solid-State Battery

The solid electrolyte layer was stuck onto the anode by flat pressing, and after the transfer substrate was removed, the cathode was put instead of the transfer substrate to be subjected to flat pressing. The integrated cathode/solid electrolyte layer/anode was vacuum-sealed by a laminated packaging material, to obtain an all-solid-state battery for evaluation.

1.6. Evaluation of Battery

As a constraint pressure of 1 MPa was applied to the all-solid-state battery, charge/discharge on the battery was repeated four times at a rate of 0.2 C, the IV resistance $R_{IV}$ ($=\Delta V_{4sec}/I_{4C}$) was measured from the voltage drop $\Delta V_{4sec}$ when CC $I_{4C}$ was applied for 5 seconds from SOC 50% at a discharge rate of 7 C, and the resistance value thereof was defined as initial resistance R1. Thereafter CC charge/CC discharge was repeated 200 cycles at a rate of 2 C from SOC 0% to 100%. Next, the IV resistance $R_{IV}$ ($=\Delta V_{4sec}/I_{4C}$) was measured from the voltage drop $\Delta V_{4sec}$ when CC $I_{4C}$ was applied for 5 seconds from SOC 50% at a discharge rate of 7 C, and the resistance value thereof was defined as resistance after the cycle R2. R2/R1 in terms of percentage was defined as "resistance increase ratio".

2. Comparative Example 2

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Comparative Example 1 except that the dispersing time by means of an ultrasonic homogenizer was 18 minutes when the cathode slurry was made.

3. Comparative Example 3

A cathode and an all-solid-state battery were made, the proportion of agglomerate present in a cathode mixture layer was calculated, and the resistance increase ratio of the all-solid-state battery after the charge/discharge cycle was measured in the same manner as in Comparative Example 1 except that a cathode slurry was made by the following steps (1A) to (3A).

(1A) A dispersion of dispersing the binder in a solvent in advance was prepared, and the cathode active material was added to the dispersion to be dispersed by means of an ultrasonic homogenizer for 2 minutes, to obtain a first slurry.

(2A) The conductive additive was added to the first slurry to be dispersed by means of an ultrasonic homogenizer for 2 minutes, to obtain a second slurry.

(3A) The sulfide solid electrolyte was added to the second slurry to be dispersed by means of an ultrasonic homogenizer for 2 minutes, to obtain a third slurry. The obtained third slurry was used as the cathode slurry.

4. Example 1

A cathode and an all-solid-state battery were made, the proportion of agglomerate present in a cathode mixture layer was calculated, and the resistance increase ratio of the all-solid-state battery after the charge/discharge cycle was measured in the same manner as in Comparative Example 1 except that a cathode slurry was made by the following steps (1B) to (3B).

(1B) A dispersion of dispersing the binder in a solvent in advance was prepared, and the conductive additive was added to the dispersion to be dispersed by means of an ultrasonic homogenizer for 2 minutes, to obtain a first slurry.

(2B) The sulfide solid electrolyte was added to the first slurry to be dispersed by means of an ultrasonic homogenizer for 2 minutes, to obtain a second slurry.

(3B) The cathode active material was added to the second slurry to be dispersed by means of an ultrasonic homogenizer for 2 minutes, to obtain a third slurry. The obtained third slurry was used as the cathode slurry.

5. Example 2

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that in the cathode slurry, the mixing ratio of the cathode active material, the sulfide solid electrolyte, the conductive additive, and the binder was, in terms of mass ratio, such that cathode active material:solid electrolyte:conductive additive:binder=70:25:2:3.

6. Example 3

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that in the cathode slurry, the mixing ratio of the cathode active material, the sulfide solid electrolyte, the conductive additive, and the binder was, in terms of mass ratio, such that cathode active material:solid electrolyte:conductive additive:binder=80:15:2:3.

7. Example 4

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that a smaller-sized cathode active material than that in Example 1, that is, whose mean value r of 20 longest circle equivalent diameters of particles thereof was 1.1 μm was used.

8. Example 5

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that a cathode active material whose particle size was smaller than that in Example 1 and larger than that in Example 4, that is, whose mean value r of 20 longest circle equivalent diameters of particles thereof was 2.0 μm was used.

9. Example 6

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that a larger-sized cathode active material than that in Example 1, that is, whose mean value r of 20 longest circle equivalent diameters of particles thereof was 8.0 μm was used.

10. Example 7

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that a larger-sized cathode active material than those in Examples 1 and 6, that is, whose mean value r of 20 longest circle equivalent diameters of particles thereof was 10.1 μm was used.

11. Example 8

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that acetylene black was used as the conductive additive instead of VGCF.

12. Example 9

A cathode slurry, a cathode, and an all-solid-state battery were made, the proportion of agglomerate present in a cathode mixture layer was calculated, and the resistance increase ratio of the all-solid-state battery after the charge/discharge cycle was measured in the same manner as in Example 1 except that furnace black was used as the conductive additive instead of VGCF.

13. Evaluation Results

The conditions and evaluation results of Comparative Examples 1 to 3 and Examples 1 to 9 were as listed in the following Tables 1 and 2.

TABLE 1

| | mean size r of cathode active material (μm) | conductive additive | composition ratio | putting order | total dispersing time (min) | thickness t of cathode mixture layer (μm) |
|---|---|---|---|---|---|---|
| Comparative Example 1 | 5.1 | VGCF | A | at the same time | 6 | 40 |
| Comparative Example 2 | 5.2 | VGCF | A | at the same time | 18 | 40 |
| Comparative Example 3 | 4.9 | VGCF | A | m-SE-a | 6 | 40 |
| Example 1 | 5.2 | VGCF | A | a-SE-m | 6 | 40 |
| Example 2 | 4.9 | VGCF | B | a-SE-m | 6 | 40 |
| Example 3 | 5.3 | VGCF | C | a-SE-m | 6 | 40 |
| Example 4 | 1.1 | VGCF | A | a-SE-m | 6 | 40 |
| Example 5 | 2.0 | VGCF | A | a-SE-m | 6 | 40 |
| Example 6 | 8.0 | VGCF | A | a-SE-m | 6 | 40 |
| Example 7 | 10.1 | VGCF | A | a-SE-m | 6 | 40 |
| Example 8 | 4.9 | acetylene black | A | a-SE-m | 6 | 40 |
| Example 9 | 5.3 | furnace black | A | a-SE-m | 6 | 40 | m: cathode active material
a: conductive additive
composition ratio A: cathode active material/sulfide solid electrolyte/conductive additive/binder = 60/35/2/3
composition ratio B: cathode active material/sulfide solid electrolyte/conductive additive/binder = 70/25/2/3
composition ratio C: cathode active material/sulfide solid electrolyte/conductive additive/binder = 80/15/2/3

TABLE 2

| | pitch 2r of through lines (μm) | total number m of through lines | number n of through lines crossing agglomerate section | proportion n/m of agglomerate present | resistance increase ratio |
|---|---|---|---|---|---|
| Comparative Example1 | 10.2 | 39 | 16 | 41% | 143% |
| Comparative Example2 | 10.4 | 38 | 14 | 37% | 145% |
| Comparative Example3 | 9.8 | 41 | 16 | 39% | 144% |
| Example 1 | 10.4 | 38 | 1 | 3% | 102% |
| Example 2 | 9.8 | 41 | 8 | 20% | 120% |
| Example 3 | 10.6 | 38 | 9 | 24% | 119% |
| Example 4 | 2.2 | 182 | 8 | 4% | 106% |
| Example 5 | 4.0 | 100 | 3 | 3% | 105% |
| Example 6 | 16.0 | 25 | 6 | 24% | 121% |
| Example 7 | 20.2 | 20 | 5 | 25% | 119% |
| Example 8 | 9.8 | 41 | 3 | 7% | 104% |
| Example 9 | 10.6 | 38 | 6 | 16% | 106% |

The following are found out from the results shown in Tables 1 and 2:

(1) when a cathode slurry is made, adding and dispersing a conductive additive, a cathode active material, and a sulfide solid electrolyte at the same time increases the proportion of agglomerate present in a cathode mixture layer obtained by using the cathode slurry, which leads to significant deterioration of the resistance increase ratio of the all-solid-state battery after the charge/discharge cycle of over 140% (Comparative Example 1). It is difficult to ease the problems of the proportion of agglomerate present and the resistance increase ratio only with a longer dispersing time when the cathode slurry is made (Comparative Example 2). When a cathode slurry is made, dispersing a cathode active material and a sulfide solid electrolyte before dispersing a conductive additive also increases the proportion of agglomerate present in a cathode mixture layer obtained by using the cathode slurry, which leads to significant deterioration of the resistance increase ratio of the all-solid-state battery after the charge/discharge cycle of over 140% (Comparative Example 3). It is believed that acid-base interactions of the conductive additive constituted of carbon causes the cathode active material to be drawn to the surface of the conductive additive, which leads to agglomeration of the cathode active material as using the conductive additive as a core, when the cathode slurry is made, since such a conductive additive has a certain specific surface area, and a functional group inevitably present on the surface thereof;

(2) dispersing a sulfide solid electrolyte after dispersing a conductive additive and thereafter dispersing a cathode active material when a cathode slurry is made lowers the proportion of agglomerate present in a cathode mixture layer obtained by using the cathode slurry to at most 25%, and outstandingly suppresses the resistance increase of the all-solid-state battery after the charge/discharge cycle (Examples 1 to 9). The presence of the sulfide solid electrolyte is believed to suppress the foregoing acid-base interactions due to carbon. It is believed that as a result, the cathode active material is difficult to be drawn to the surface of the conductive additive, which leads to suppression of agglomeration of the cathode active material as using the conductive additive as a core;

(3) increase of the amount of a cathode active material in a cathode slurry leads to easy agglomeration of the cathode active material (Examples 2 and 3). In this case as well, dispersing a sulfide solid electrolyte after dispersing a conductive additive and thereafter dispersing the cathode active material when the cathode slurry is made may suppress agglomeration of the cathode active material, which does not lead to excessive deterioration of the resistance increase ratio of the all-solid-state battery after the charge/discharge cycle;

(4) the larger a cathode active material contained in a cathode mixture layer is, the easier the resistance increase ratio of the all-solid-state battery after the charge/discharge cycle deteriorates (Examples 4 to 7). It is believed to be because a large cathode active material leads to a narrow specific surface area of the active material, which leads to a small contact area of the active material and a sulfide solid electrolyte. In this case as well, dispersing the sulfide solid electrolyte after dispersing a conductive additive and thereafter dispersing the cathode active material when a cathode slurry is made may suppress agglomeration of the cathode active material, which does not lead to excessive deterioration of the resistance increase ratio of the all-solid-state battery after the charge/discharge cycle; and (5) while it is believed that acid-base interactions due to a conductive additive is given irrelevantly to the conductive additive as long as the conductive additive is constituted of carbon, dispersing a sulfide solid electrolyte after dispersing the conductive additive and thereafter dispersing a cathode active material when a cathode slurry is made gives a desired effect irrelevantly to the conductive additive constituted of carbon (Examples 8 and 9).

The Examples show the mode of using a specific conductive additive. The technique of the present disclosure is not limitedly applied to the mode. As described above, any conductive additive constituted of carbon, irrelevantly to its type, may cause the same problem.

The Examples show the mode of using a specific sulfide solid electrolyte. The technique of the present disclosure is not limitedly applied to the mode. A sulfide solid electrolyte generally employed for all-solid-state batteries is believed to have the effect of suppressing acid-base interactions of a conductive additive with an active material, irrelevantly to whether the electrolyte is crystalline or amorphous.

The Examples show the mode of using a specific cathode active material. The technique of the present disclosure is not limitedly applied to the mode. Any cathode active material generally employed for all-solid-state batteries may agglomerate as using a conductive additive as a core. Particularly, the foregoing acid-base interactions are believed to strongly work on a basic cathode active material. That is, it is believed that the effect by the technique of the present disclosure is further outstanding when a basic cathode active material such as a Li-containing compound, more specifically a lithium-containing transition metal oxide is employed.

The Examples show the mode of dispersing the binder in the solvent in advance before dispersing the conductive additive etc. when the cathode slurry was made. The technique of the present disclosure is not limitedly applied to the mode. The effect of suppressing agglomeration of a cathode active material may be secured irrelevantly to whether a binder is present or not. A binder may be dispersed at any timing. Dispersing a binder in a solvent in advance before dispersing a conductive additive etc. may cause the thickening effect of the binder to further improve dispersiveness of the solid content.

INDUSTRIAL APPLICABILITY

The all-solid-state battery obtained by the technique of the present disclosure may be preferably used as, for example, a large-sized automobile power source.

REFERENCE SIGN LIST 1 first slurry
1a solvent
1b conductive additive
2 second slurry
2a sulfide solid electrolyte
3 third slurry
3a cathode active material
4 binder
10 cathode mixture layer
20 cathode current collector
30 anode mixture layer
31 anode active material
32 solid electrolyte
33 binder
40 anode current collector
51 solid electrolyte
52 binder
100 cathode
200 anode
300 solid electrolyte layer
1000 all-solid-state battery

What is claimed is:

1. A cathode that includes a cathode mixture layer, wherein
    the cathode mixture layer contains a conductive additive constituted of carbon, a sulfide solid electrolyte, and a cathode active material,
    a proportion of agglomerate present in the cathode mixture layer is at most 25%, and
    a mean value of diameters of 20 circles is at most 10.1 μm when 20 largest particles of the cathode active material are fitted with the circles on a two dimensional image obtained by observation of a cross section of the cathode mixture layer, the cathode active material being contained in the cathode mixture layer.

2. The cathode according to claim 1, wherein the cathode active material is a lithium-containing transition metal oxide.

3. The cathode according to claim 1, wherein the conductive additive is at least one selected from a vapor grown carbon fiber, acetylene black, and furnace black.

4. An all-solid-state battery comprising:
    the cathode according to claim 1;
    an anode; and
    a solid electrolyte layer.

* * * * *